May 14, 1935.  P. K. DEWAR  2,000,932
CHAIN LINK
Filed Jan. 8, 1934
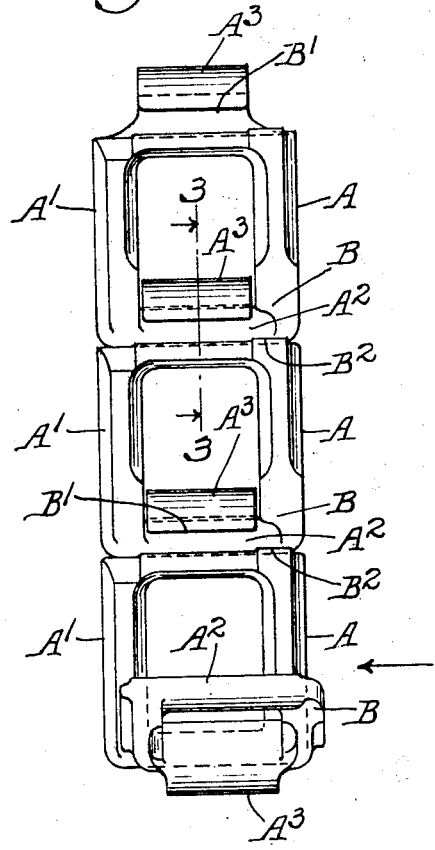
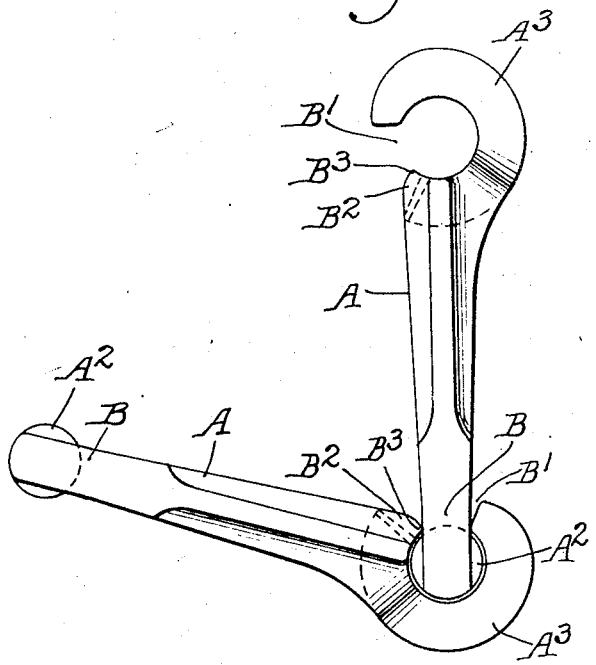
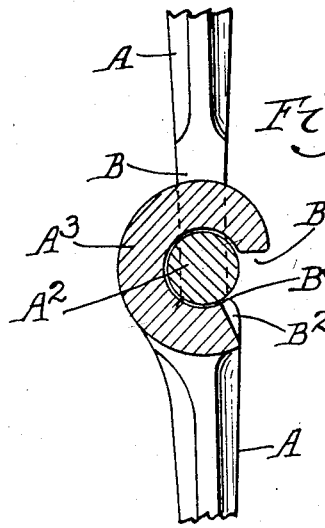
Inventor
Peter K. Dewar.
by Parker Carter
Attorneys.

Patented May 14, 1935

2,000,932

UNITED STATES PATENT OFFICE 2,000,932

CHAIN LINK

Peter K. Dewar, Indianapolis, Ind., assignor to Link-Belt Company, Chicago, Ill., a corporation of Illinois Application January 8, 1934, Serial No. 705,665

10 Claims. (Cl. 74—249)

My invention relates to improvements in chain links and has for one object to provide a new and improved form of link for assembly into a chain belt wherein while the links may be easily and conveniently assembled and disassembled when that is desired, means are provided which will prevent accidental and undesired disassembly of the links.

The importance of this invention lies in the fact that while the links of the so-called Ewart type and they may be of malleable iron or stamped steel, are ordinarily assembled by machinery into a chain, nevertheless when chain is being cut to proper length for making belt drives and the like, the operator unrolling assembled chain on the bench frequently has trouble with the links rotating into the disengaging position and then dropping apart. My invention has for its object to provide means which while not interfering with the ordinary manipulation of the link for assembly and disassembly will nevertheless provide a sufficient preventive effect to avoid accidental disassembly. Other objects will appear from time to time throughout the specification and claims.

My invention is illustrated more or less diagrammatically in the accompanying drawing, wherein—

Figure 1 is a plan view of a section of chain embodying my invention;

Figure 2 is a side elevation on an enlarged scale of the lower portion of Figure 1 viewed in the direction of the arrow;

Figure 3 is a section along the line 3—3 of Figure 1.

Like parts are indicated by like characters throughout the specification and drawing.

It will be understood that the chain is assembled from a series of identical links. Each link has side bars A A$^1$, an end or pintle bar A$^2$ and a hook A$^3$. One side bar of each link in this case the side bar A may be slightly reduced in thickness as at B. The hook, of course, has an open mouth B$^1$. The chain is assembled and disassembled by rotating it into the position shown in Figure 2 when the links may be laterally separated, the beginning of such lateral separation being shown in the lower part of Figure 1. It will be understood that at least one side bar is of slightly less thickness than the width of the open mouth B$^1$ of the hook and so since there is sufficient clearance between this side bar and the hook, the lateral displacement of the links is simple and easy, so simple and easy that if by chance the links find themselves in the position shown in Figure 2, that lateral displacement might take place without the will of the operator and the chain might come apart unless prevented. In order to prevent this a projecting portion B$^2$ is provided having a relatively sharp edge B$^3$ which engages the surface of the side bar and exerts a slight resistance to lateral displacement because the distance between this sharpened edge B$^3$ and the hook B is such that when the side bar passes through that space, a slight pressure is exerted on the side bar by the sharpened edge B$^3$. This pressure exerts a sufficient resistance to prevent accidental lateral displacement but a slight pressure of the operator is ample to cause disengagement.

Of course, because this sharpened edge B$^3$ on the projection portion B$^2$ is in immediate contact with the side bar when engagement or disengagement takes place, there is a certain amount of wear on the edge and on the side bar and a few manipulations of the link will usually so wear down the opposed surfaces that the effectiveness of the pad disappears. This is of no consequence, however, because all that is required is that the parts be held together during assembly of the chain at the factory, during shipment, and while being installed for a drive. Once the chain or belt is placed on the drive where it is to be used, there is no possibility of the links accidentally assuming the angular position shown in Figure 2 and the hook B itself penetrating between the side bars holds the parts in proper alignment and in fact the wearing away of chain and pad resulting from one or two manipulations of the links is advantageous because after the chain has been assembled and shipped, the more easy the disassembly is, the better from the point of view of the ultimate consumer. In ordinary use, once the chain is installed there will be no wear affecting the projecting portion B$^2$, because this part is not in contact with anything during ordinary use of the chain and the uncoupling cannot take place during the running of the chain because when the chain is in position in a drive its links cannot be rotated to the uncoupling position. Wear thus takes place between the hook and the projecting portion B$^2$ only when the links are being coupled and uncoupled.

The relationship between the projecting portion and the hook is in a sense a yielding relationship. The hook or perhaps even the surface of the link can spring sufficiently to permit the passage of the side bar through the hook and of course other means might be provided to accomplish this yielding resistance. It will, of course, be understood that the projecting portion or the other means, whatever they may be, are located at one side of the hook portion so that there is no chance of their interfering with the articulation of the chain when it is in operation.

I claim:

1. A link for chain belts and the like comprising side bars, an end bar and a hook, a projecting portion associated with the hook having a relatively sharp edge in line with one of said bars, the distance between such edge and the opposed open face of the hook being substantially the same as the thickness of the side bar adjacent the pintle bar.

2. In a link belt comprising a plurality of articulated links, each having side bars and at one end a hook and at the other end a pintle bar, fixed means normally out of line with the hook and in line with one side bar for providing a limited resistance to relative lateral displacement of adjacent links when they are in a maximum angular displacement.

3. In combination, a plurality of articulated chain links couplable with each other when in angular relation only, each having side bars and a pintle pin and a hook the opening of the hook being less than the diameter of the pintle pin, the hook being adapted to permit lateral displacement of adjacent links when the links are in uncoupling position and fixed means associated with the hook for resisting lateral displacement of the links.

4. In combination, a plurality of articulated chain links couplable with each other when in angular relation only, each having side bars and a pintle pin and a hook the opening of the hook being less than the diameter of the pintle pin, the hook being adapted to permit lateral displacement of adjacent links when the links are in uncoupling position and fixed means in line with a side bar and associated with the hook for resisting lateral displacement of the links, said means comprising a pad adapted to restrict the effective opening of the hook.

5. In combination, a plurality of articulated chain links couplable with each other when in angular relation only, each having side bars and a pintle pin and a hook the opening of the hook being less than the diameter of the pintle pin, the hook being adapted to permit lateral displacement of adjacent links when the links are in uncoupling position and fixed means in line with a side bar and associated with the hook for resisting lateral displacement of the links, said means comprising a projecting portion adapted to restrict the effective opening of the hook, a projecting portion having a relatively sharp edge adapted to frictionally engage the opposed side bar when the links are laterally displaced and uncoupling.

6. A link for chain belts and the like comprising side bars, a pintle pin and a hook, a projecting portion associated with one side bar having a relatively sharp edge, the distance between such edge and the opposed face of the hook being substantially slightly less than the thickness of one side bar adjacent the pintle bar, the hook having an opening less than the diameter of said pintle pin.

7. In a link belt comprising a plurality of articulated links, each link having side bars, a hook at the ends of said bars, a pintle bar at the opposite ends of said bars and fixed means on one side bar normally out of line with the hook for providing a limited resistance to relative lateral displacement of adjacent links when they are in uncoupling position.

8. In a chain, a plurality of articulated hooked links, each link having side bars and a pintle pin extending between them to engage the hook on the adjacent link, a fixed projecting portion on one of said side bars joining the hook of each link, the hook being open so that when adjacent links are in uncoupling position, the pintle pin may be laterally withdrawn from the hook, said fixed projecting portion constituting frictional means on one of said side bars for permitting such lateral withdrawal by the use of a relatively slight lateral force, said means being adapted to frictionally engage the side bar.

9. In a link for chain belts and the like comprising side bars, a pintle bar and a hook, a projecting portion associated with the hook having a relatively sharp edge and offset with respect to said hook, the distance between such edge and the opposed face of the hook being substantially the same as the thickness of the side bar adjacent the pintle bar.

10. In a chain, a plurality of articulated links, each link comprising a pair of side bars, a pintle joining them adjacent one end and a partially open hook joining them adjacent the opposite end of the link, a fixed projecting portion on one of said side bars, spaced in opposition to said hook, the distance between said projection and the opposed face of said hook being substantially the same as the thickness of the side bar adjacent the pintle, whereby assembly of one link upon the other is made relatively difficult and is accomplished by overcoming frictional resistance between the side bar, the hook and said fixed projecting portion, the diameter of the pintle being greater than that of the opening of the hook.

PETER K. DEWAR.